(12) United States Patent
Matsuura (10) Patent No.: US 11,906,475 B2
(45) Date of Patent: Feb. 20, 2024

(54) MATERIAL TESTING MACHINE AND METHOD FOR CONTROLLING MATERIAL TESTING MACHINE

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 412 days.

(21) Appl. No.: 17/414,945

(22) PCT Filed: Jun. 25, 2019

(86) PCT No.: PCT/JP2019/025134
§ 371 (c)(1),
(2) Date: Jun. 16, 2021

(87) PCT Pub. No.: WO2020/129283
PCT Pub. Date: Jun. 25, 2020

(65) Prior Publication Data
US 2022/0057308 A1 Feb. 24, 2022

(30) Foreign Application Priority Data
Dec. 21, 2018 (JP) ................................. 2018-239054

(51) Int. Cl.
*G01N 3/06* (2006.01)
*G01N 3/08* (2006.01)
(Continued)

(52) U.S. Cl.
CPC ................. *G01N 3/06* (2013.01); *G01N 3/08* (2013.01); *G05B 11/42* (2013.01); *G05B 13/042* (2013.01);
(Continued)

(58) Field of Classification Search
None
See application file for complete search history.

(56) References Cited

U.S. PATENT DOCUMENTS 6,205,863 B1 * 3/2001 Ishii ...................... G05D 15/01
73/806
7,784,355 B2 * 8/2010 Kawano ................... G01N 3/32
73/788

(Continued)

FOREIGN PATENT DOCUMENTS

JP H11136983 A * 5/1999
JP 11201888 A * 7/1999

(Continued)

OTHER PUBLICATIONS

"International Search Report (Form PCT/ISA/210) of PCT/JP2019/025134," dated Aug. 13, 2019, with English translation thereof, pp. 1-4.

(Continued)

*Primary Examiner* — Herbert K Roberts
(74) *Attorney, Agent, or Firm* — JCIPRNET (57) ABSTRACT

In a case where control input is performed via a low-pass filter, a control gain more appropriate for both stability and responsiveness is set according to setting of the low-pass filter. A control unit (21) performs control input for a load mechanism (40) via a low-pass filter, discriminates a stability of a control system including the load mechanism (40) and the low-pass filter when setting of the low-pass filter is changed, sets an appropriate control gain based on a maximum control gain at which an excess amount of a measured value with respect to a target value is equal to or less than a predetermined value within a range where that the control system is stable, and controls an operation of the load mechanism (40) by using the appropriate control gain.

6 Claims, 5 Drawing Sheets

(51) Int. Cl.
　　　*G05B 11/42*　　　(2006.01)
　　　*G05B 19/404*　　(2006.01)
　　　*G05B 13/04*　　　(2006.01)
(52) U.S. Cl.
　　　CPC ... *G05B 19/404* (2013.01); *G01N 2203/0017* (2013.01); *G01N 2203/0037* (2013.01); *G01N 2203/0202* (2013.01); *G01N 2203/0617* (2013.01)

(56) References Cited

U.S. PATENT DOCUMENTS

| | | | | |
|---|---|---|---|---|
| 2002/0111758 | A1* | 8/2002 | Wang | G05B 11/42 702/79 |
| 2007/0210731 | A1* | 9/2007 | Yoshiura | H02P 23/0004 318/163 |
| 2009/0251092 | A1* | 10/2009 | Zhang | G05B 19/19 318/609 |
| 2011/0288791 | A1* | 11/2011 | Jeppesen | G01N 3/38 702/42 |
| 2013/0214718 | A1* | 8/2013 | Ikeda | G05B 19/19 318/609 |
| 2014/0191702 | A1* | 7/2014 | Yoshiura | H02P 23/20 318/651 |
| 2014/0324390 | A1* | 10/2014 | White | G05B 13/0205 702/189 |
| 2015/0252664 | A1* | 9/2015 | Astrid | E21B 21/08 700/275 |
| 2017/0261950 | A1* | 9/2017 | Mori | G05B 19/0426 |
| 2017/0268519 | A1* | 9/2017 | Kozaki | F04D 29/058 |
| 2019/0004482 | A1* | 1/2019 | Ito | G05B 13/024 |
| 2020/0133226 | A1* | 4/2020 | Tsuneki | G06N 3/006 |
| 2020/0192303 | A1* | 6/2020 | Saito | G05B 19/19 |

FOREIGN PATENT DOCUMENTS

| | | | | |
|---|---|---|---|---|
| JP | 2000146747 | | 5/2000 | |
| JP | 2003106966 | A * | 4/2003 | |
| JP | 2005331256 | A * | 12/2005 | |
| JP | 2005337812 | A * | 12/2005 | |
| JP | 2008233075 | A * | 10/2008 | |
| JP | 2010142117 | A * | 6/2010 | |
| JP | 2011153895 | A * | 8/2011 | |
| JP | WO2015015876 | A1 * | 3/2017 | |
| JP | 2018096841 | | 6/2018 | |
| WO | WO-2007029825 | A1 * | 3/2007 | G05B 19/19 |
| WO | WO-2012011173 | A1 * | 1/2012 | G01N 3/08 |
| WO | WO-2015178084 | A1 * | 11/2015 | B65H 18/103 |

OTHER PUBLICATIONS

"Written Opinion of the International Searching Authority (Form PCT/ISA/237) of PCT/JP2019/025134," dated Aug. 13, 2019, with English translation thereof, pp. 1-4.

Office Action of China Counterpart Application, with English translation thereof, dated Nov. 1, 2023, pp. 1-13.

* cited by examiner

MATERIAL TESTING MACHINE AND METHOD FOR CONTROLLING MATERIAL TESTING MACHINE

CROSS-REFERENCE TO RELATED APPLICATION

This application is a 371 application of the International PCT application serial no. PCT/JP2019/025134, filed on Jun. 25, 2019, which claims the priority benefits of Japan Patent Application No. 2018-239054, filed on Dec. 21, 2018. The entirety of each of the above-mentioned patent applications is hereby incorporated by reference herein and made a part of this specification.

TECHNICAL FIELD

The present invention relates to a material testing machine and a method for controlling the material testing machine.

BACKGROUND ART

In a material testing machine, it is common to perform a test with a predetermined stress or strain as a target, and a difference between a measured value by a load cell, a displacement meter, or the like and the target value is fed back to control an operation of the load mechanism that gives a test force to a test target (for example, see Patent Literature 1).

In this type of material testing machine, in order to reduce the influence of disturbance noise, control input is generally performed via a low-pass filter, and the setting (the setting of a cutoff frequency) of a low-pass filter can be changed by the user within a predetermined range.

CITATION LIST

Patent Literature

Patent Literature 1: JP 2018-96841 A

SUMMARY

Technical Problem

As described above, in a case where a low-pass filter is used to reduce the influence of disturbance noise, the control may become unstable due to the time delay caused by the low-pass filter. Therefore, it is conceivable to adjust a control gain to ensure the stability of the control.

However, in the conventional material testing machine, the setting of the low-pass filter can be changed within a predetermined range. However, the control gain is not automatically changed in conjunction with the setting. Therefore, when the control gain is excessive, the control tends to become unstable. Thus, even when the low-pass filter is changed, the control gain is set low so that stable control is always performed, and a responsiveness is not always optimal.

The present invention has been made in view of this circumstance, and an object of thereof is to provide a material testing machine and a method for controlling the material testing machine capable of setting a more appropriate control gain for both stability and responsiveness according to setting of a low-pass filter in a case where control input is performed via the low-pass filter.

Solution to Problem

In a first invention, a material testing machine includes: a load mechanism which applies a test force to a test target; a measuring instrument which measures a physical quantity of the test target which changes according to the test force or the application of the test force; and a control unit which performs a material test on the test target by controlling the test force, the physical quantity of the test target, or a physical quantity acting on the test target to reduce a difference between a predetermined target value and a value measured by the measuring instrument. The control unit performs control input for the load mechanism via a low-pass filter, determines, when setting of the low-pass filter is changed, an appropriate control gain based on a control gain within a range where a control system including the load mechanism and the low-pass filter is stable, and controls an operation of the load mechanism by using the appropriate control gain.

In a second invention, in the material testing machine according to the first invention, the control unit controls the test force by proportional control and integral control, the control gain is an integral gain and a proportional gain, and an appropriate proportional gain and an appropriate integral gain are determined as the appropriate control gain.

In a third invention, in the material testing machine according to the second invention, in a discriminant of an equation with a denominator of a transfer function of the control system as 0, the control unit extracts a point at which a value of the discriminant becomes maximum when the proportional gain is used as a variable and determines the appropriate proportional gain on a basis of the proportional gain at the extracted point.

In a fourth invention, in the material testing machine according to the third invention, when the appropriate proportional gain is substituted into the discriminant, and the integral gain is used as a variable, the control unit determines the appropriate integral gain on a basis of the maximum integral gain in a range where a value of the discriminant is 0 or more.

In a fifth invention, in the material testing machine according to the third invention or the fourth invention, when an order of a denominator of the transfer function is a fourth order or higher, the control unit uses, as the discriminant, a discriminant of an equation obtained by approximating the denominator to a third order or less.

In a sixth invention, a material testing machine includes a load mechanism which applies a test force to a test target, a measuring instrument which measures a physical quantity of the test target which changes according to the test force or the application of the test force, and a control unit which performs a material test on the test target by controlling the test force, a physical quantity of the test target, or a physical quantity acting on the test target to reduce a difference between a predetermined target value and a value measured by the measuring instrument. A method for controlling the material testing machine includes: a step of the control unit performing control input for the load mechanism via a low-pass filter; a step of the control unit determining, when setting of the low-pass filter is changed, an appropriate control gain based on a control gain within a range where a control system including the load mechanism and the low-pass filter is stable; and a step of the control unit controlling an operation of the load mechanism by using the appropriate control gain.

Incidentally, the specification of this application contains the whole content of Japanese Patent Application No. 2018-239054 filed on Dec. 21, 2018.

Advantageous Effects of Invention

According to the first invention, when the setting of the low-pass filter is changed, the control unit determines the appropriate control gain based on the control gain within the range where the control system including the load mechanism and the low-pass filter is stable. Then, the control unit controls the operation of the load mechanism by using the appropriate control gain. Accordingly, when the low-pass filter setting is changed, it is possible to determine a control gain more appropriate for both stability and responsiveness of the control system according to the changed setting of the low-pass filter.

According to the second invention, when the test force is controlled by proportional control and integral control, more appropriate proportional gain and integral gain can be set according to the change of the low-pass filter.

According to the third invention, when the discriminant of the equation is used in which the denominator of the transfer function of the control system is 0 (zero), it is possible to easily determine the appropriate proportional gain while ensuring the stability of the control system.

According to the fourth invention, when the discriminant of the equation is used in which the denominator of the transfer function of the control system is 0, it is possible to easily determine the appropriate integral gain while ensuring the stability of the control system.

According to the fifth invention, the equation obtained by approximating the order of the denominator of the transfer function of the control system to the third order or less is used to simplify the arithmetic processing by the discriminant, and thus it is possible to determine the appropriate proportional gain and integral gain.

According to the sixth invention, the same effect as that of the first invention can be obtained by carrying out the method of the sixth invention with the material testing machine.

DESCRIPTION OF EMBODIMENTS

1. Configuration of Material Testing Machine

Hereinafter, embodiments of the present invention will be described with reference to the drawings.

Figure 1:
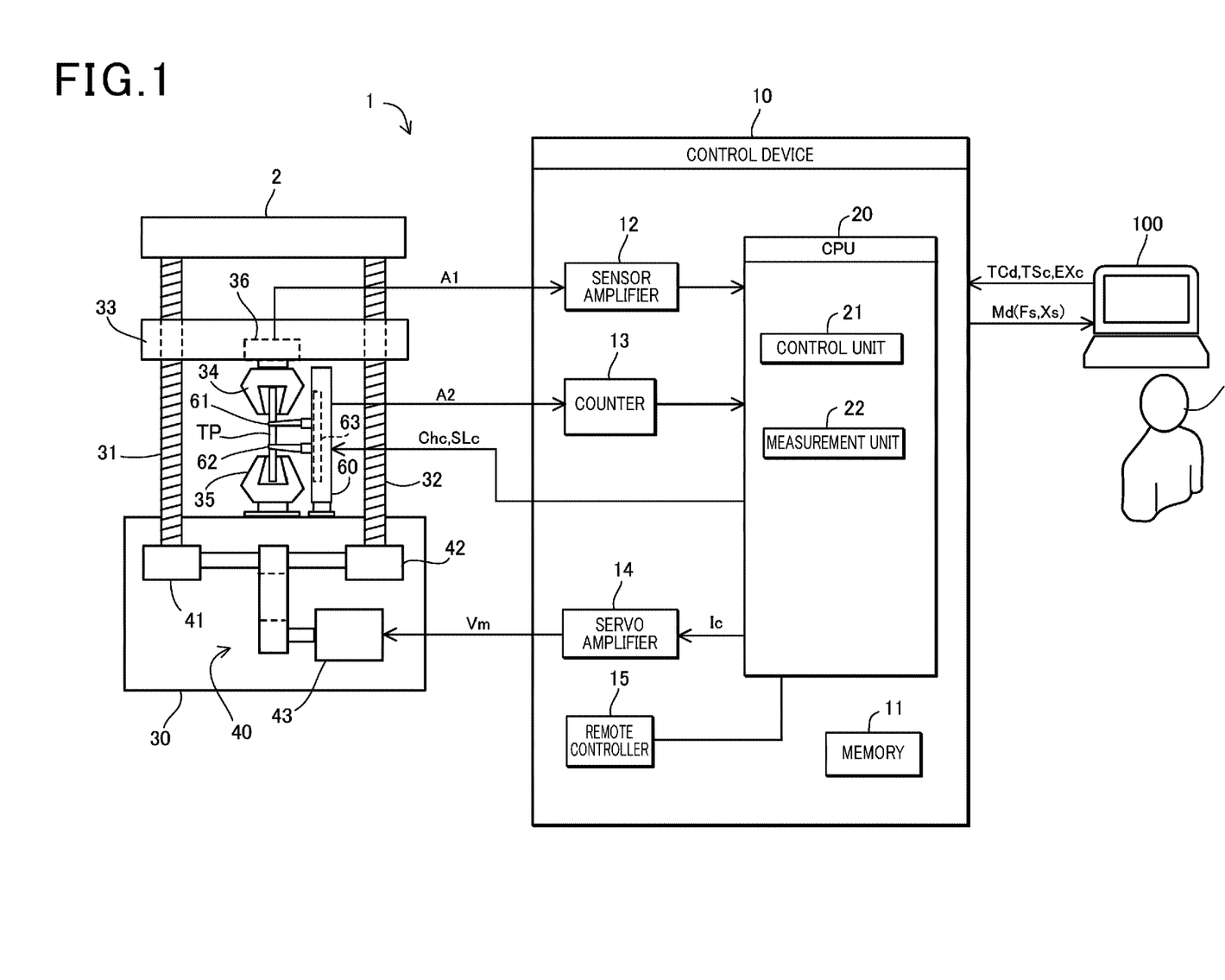
FIG. 1 is a diagram schematically illustrating a configuration of a material testing machine according to an embodiment of the present invention.

FIG. 1 is a diagram schematically illustrating the configuration of a material testing machine 1 according to this embodiment.

The material testing machine 1 of this embodiment is a so-called tensile testing machine and is a testing machine which tests a specific mechanical property of a material which determines durability or the like against external forces such as tension and shear.

The material testing machine 1 includes a tensile testing machine body 2 which performs a tensile test by applying a test force as a load to a test piece TP which is a material to be tested, a control device 10 which controls a tensile test operation by the testing machine body 2, and an extensometer 60 which measures the extension amount of the test piece TP. The extensometer 60 is an automatic extensometer which grips and releases the test piece TP without a manual work of a user.

The extensometer 60 includes an upper arm 61 and a lower arm 62 which grip the test piece TP and are displaced with the test piece TP, and an arm actuator 63. The arm actuator 63 is, for example, an electric motor, and moves the upper arm 61 and the lower arm 62 in a vertical direction. The tips of the upper arm 61 and the lower arm 62 have a U-shape that can be opened and closed, and are switched between an open state and a closed state by the arm actuator 63.

When a tensile test is executed, the tip portions of the upper arm 61 and the lower arm 62 become in the closed state by the arm actuator 63, and the test piece TP is gripped by the upper arm 61 and the lower arm 62. During the execution of the tensile test, the upper arm 61 and the lower arm 62 are released from being held in the vertical direction by the arm actuator 63, and the upper arm 61 and the lower arm 62 are displaced according to the extension of the test piece TP. On the other hand, when the tips of the upper arm 61 and the lower arm 62 becomes in the open state by the arm actuator 63, the test piece TP is released from the upper arm 61 and the lower arm 62.

The extensometer 60 measures the extension amount of the test piece TP by a magnetic induction type linear sensor and outputs, to the control device 10, an extension amount measurement signal A2 in which one pulse is generated each time the test piece TP extends by a predetermined amount. Incidentally, a strain gauge type sensor may be used to measure the extension amount of the test piece TP.

2. Configuration of Testing Machine Body

The testing machine body 2 includes a table 30, a pair of screw rods 31 and 32 rotatably erected on the table 30 in a vertical direction, a crosshead 33 movable along these screw rods 31 and 32, a load mechanism 40 which moves the crosshead 33 to apply a load to the test piece TP, and a load cell 36. The load cell 36 is a sensor which measures a test force which is a tensile load applied to the test piece TP and outputs, to the control device 10, a test force measurement signal A1 indicating the measured test force. The test force corresponds to the physical quantity of the present invention, and the load cell 36 corresponds to the measuring instrument of the present invention. Incidentally, the configuration may be such that one screw rod is used.

The pair of screw rods 31 and 32 are formed by ball screws, and the crosshead 33 is connected to the screw rods 31 and 32 via nuts (not illustrated). The load mechanism 40 includes worm reducers 41 and 42 connected to the lower ends of the screw rods 31 and 32, and a servomotor 43 connected to each of the worm reducers 41 and 42, respectively.

The load mechanism 40 transmits the rotation of the servomotor 43 to the pair of screw rods 31 and 32 via the worm reducers 41 and 42, and the screw rods 31 and 32 rotate in synchronization, whereby the crosshead 33 ascends and descends along the screw rods 31 and 32.

The crosshead 33 is provided with an upper gripper 34 for gripping the upper end of the test piece TP, and the table 30 is provided with a lower gripper 35 for gripping the lower end of the test piece TP. During the tensile test, when the crosshead 33 is caused to ascend by the control of the control device 10 in a state where the upper end of the test piece TP is gripped by the upper gripper 34, and the lower end of the test piece TP is held by the lower gripper 35, the testing machine body 2 gives a test force to the test piece TP.

3. Configuration of Control Device

The control device 10 controls the operation of the testing machine body 2 and measures the test status. A PC (Personal Computer) 100 which is an external control device is connected to the control device 10, and the PC 100 communicates with the control device 10 to set test conditions for a tensile test and, instruct to start the tensile test, monitor the progress of the tensile test, display and analyze the measurement data, and so on.

The control device 10 is an electronic circuit unit configured by a CPU (Central Processing Unit) 20, a memory 11, an interface circuit (not illustrated), and the like. The control device 10 includes a sensor amplifier 12 which amplifies the test force measurement signal A1 output from the load cell 36, a counter 13 which counts the number of pulses of the extension amount measurement signal A2 output from the extensometer 60, and a servo amplifier 14 which supplies driving current to the servomotor 43. Further, the control device 10 includes a remote controller 15 for instructing the upper arm 61 and the lower arm 62 of the extensometer 60 to move in the vertical direction or to be opened or closed.

The control device 10 functions as a control unit 21 and a measurement unit 22 by executing a control program for the control device 10 stored in the memory 11 by the CPU 20. The control unit 21 executes the processing of each step in the method for controlling the material testing machine of the present invention. The control device 10 receives a test condition command TCd, a test start command TSc, an extensometer operation command EXc, and the like which are transmitted from the PC 100.

When the control unit 21 receives the test start command TSc, the control unit 21 controls the operation of the tensile test of the testing machine body 2 in accordance with the test condition command TCd. The test condition command TCd specifies test conditions such as origin adjustment, a stroke range, and a tensile speed. Further, the setting (the setting of cutoff frequency) of the low-pass filter of the control system which will be described later is also changed by the test condition command TCd. The setting of the low-pass filter may be stepless or may be multiple steps (five steps or the like).

When the control unit 21 receives the extensometer operation command EXc, the control unit 21 outputs, to the extensometer 60, a slide control signal SLc for instructing the upper arm 61 and the lower arm 62 to slide up and down, an opening/closing control signal Chc for instructing the opening/closing of the tip portion of the upper arm 61 and the lower arm 62, or the like according to the instruction content of the extensometer operation command EXc.

The measurement unit 22 recognizes the measured value (hereinafter, referred to as a measured test force Fs) of the test force applied to the test piece TP on the basis of the test force measurement signal A1 amplified by the sensor amplifier 12. Further, the measurement unit 22 recognizes the upward displacement (extension amount) (hereinafter, referred to as a measured displacement Xs) of the test piece TP from at the time of starting the tensile test on the basis of the number of pulses of the extension amount measurement signal A2 counted by the counter 13. The upward displacement corresponds to the physical quantity of the present invention. Then, the measurement unit 22 transmits, to the PC 100, measurement data Md including the measurement test force Fs and the measurement displacement Xs.

The PC 100 acquires the execution conditions of the tensile test set by the operation of a user P and transmits the test condition command TCd to the control device 10. Further, the PC 100 accepts the start of the tensile test instructed by the operation of the user P and transmits the test start command TSc to the control device 10. Further, the PC 100 receives the measurement data Md transmitted from the control device 10, recognizes the measurement test force Fs and the measurement displacement Xs, and displays a monitor screen showing the transition of the measurement test force Fs and the measurement displacement Xs or the like.

4. Configuration of Control System

Figure 2:
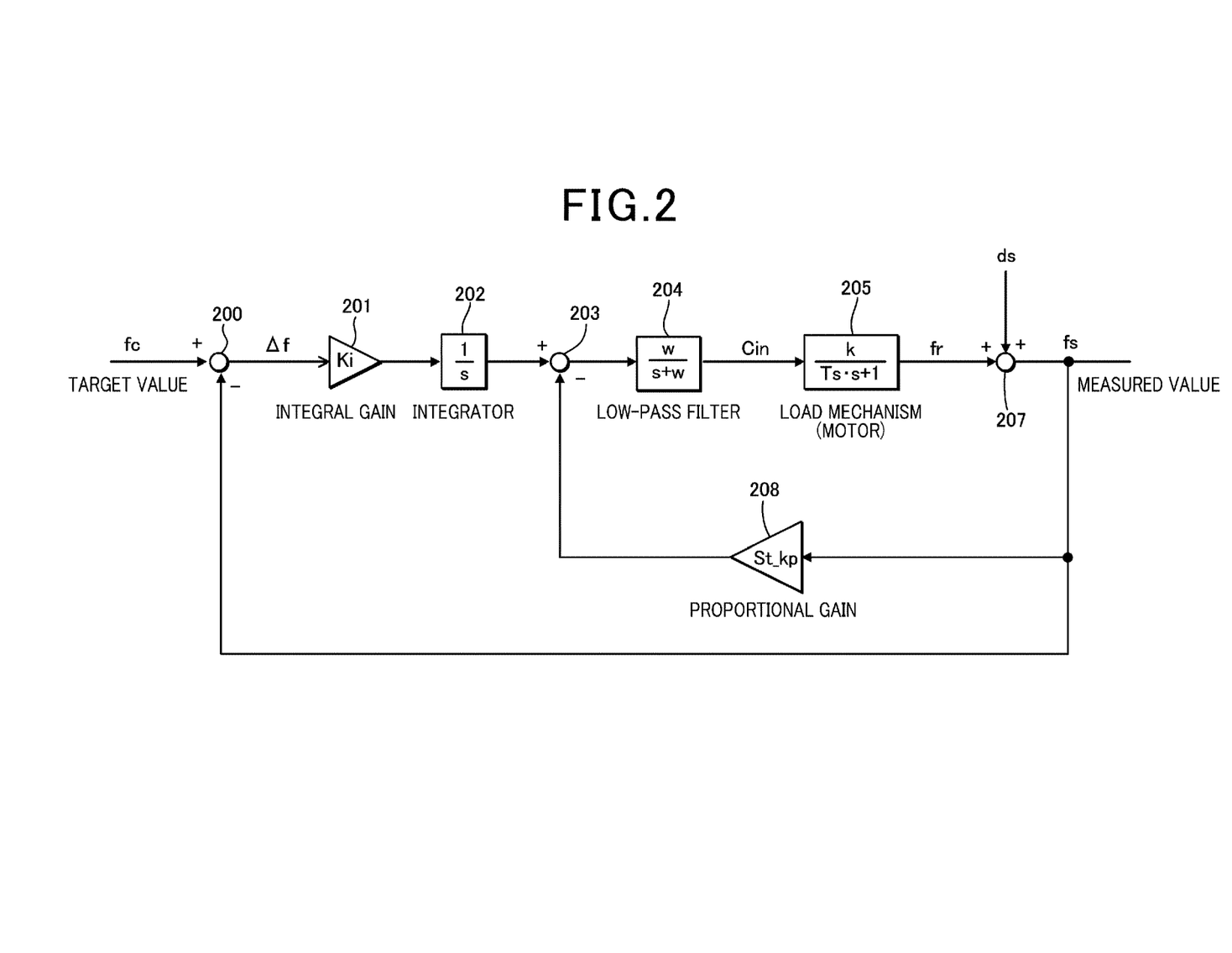
FIG. 2 is a block diagram of a control system.

A configuration for controlling the test force applied to the test piece TP will be described with reference to FIG. 2. FIG. 2 is a block diagram of a test force control system according to this embodiment, and the control unit 21 performs PI (proportional integration) control based on this block diagram to determine control input Cin for the servomotor 43.

In the block diagram of FIG. 2, a difference Δf between the target value (target test force) fc and the measurement test force fs of the test force is calculated by a subtractor 200, and the difference Δf is multiplied by an integral gain Ki by a multiplier 201, and the result is input to the integrator 202. Then, the subtractor 203 subtracts, from the output of the integrator 202, the value obtained by multiplying the measurement test force fs by a proportional gain St_kp by the multiplier 206.

Then, with the output of the subtractor 203, the control input Cin for the servomotor 43 is calculated via the low-pass filter 204, and a control of reducing the difference Δf is performed. In the block diagram of FIG. 2, an adder 207 indicates that the measurement test force fs is obtained by superimposing the disturbance noise ds on the test force fr actually applied to the test piece TP.

The block diagram of FIG. 2 is illustrated by a transfer function as following Equation (1).

[Math. 1]

$$G(s) = (Ki \cdot k \cdot w) / \left( s(Ts+1)(w+1) \left( \frac{St\_Kp \cdot k \cdot w}{(Ts+1)(w+s)} + 1 \right) \left( \frac{Ki \cdot k \cdot w}{s(Ts+1)(w+s)\left(\frac{St\_Kp \cdot k \cdot w}{(Ts+1)(w+s)}\right)} + 1 \right) \right) = \quad (1)$$

-continued $$\frac{Ki \cdot k \cdot w}{(Ts^2 + (St\_Kp \cdot k + 1)s + Ki \cdot k)w + Ts^3 + s^2}$$

The control unit 21 determines the more appropriate proportional gain St_Kp and the integral gain Ki by using the discriminant D for a cubic equation of a Laplace operator s in following Equation (2) in which the denominator of the transfer function G(s) in the above equation (1) is 0.

[Math. 2]

$$(Ts^2+(St\_Kp\cdot k+1)s+Ki\cdot k)w+Ts^3+s^2=0 \quad (2)$$

Here, the discriminant D of the general equation of a cubic equation of following Equation (3) is as following Equation (4), and thus the control unit 21 sets the discriminant D of the above Equation (2) in the form of following Equation (4).

[Math. 3]

$$ax^3+bx^2+cx+d=0 \quad (3)$$

[Math. 4]

$$D=-4ac^3-27a^2d^2+b^2c^2+18abcd-4b^3d \quad (4)$$

5. Determining Appropriate Control Gain According to Setting Change of Low-Pass Filter According to the flowchart illustrated in FIG. 3, a process is described in which appropriate proportional gain and integral gain corresponding to the changed cutoff frequency are determined in case where the setting (the setting of cutoff frequency) of the low-pass filter 204 is changed by the operation of the PC 100.

Figure 3:
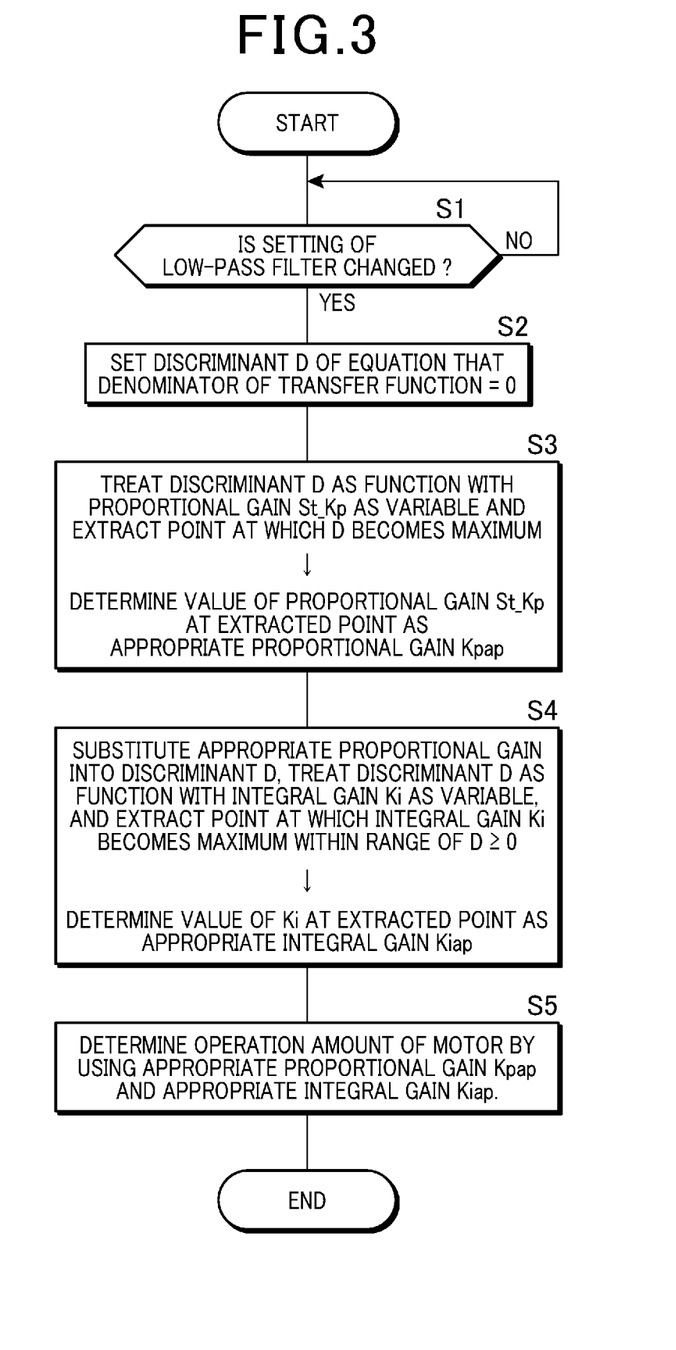
FIG. 3 is a flowchart of a setting process of a control gain.

The process according to the flowchart illustrated in FIG. 3 is executed by the control unit 21. The control unit 21 proceeds to step S2 when the setting of the low-pass filter 204 is changed in response to the test condition command TCd transmitted from the PC 100 in step S1 of FIG. 3. In step S2, the control unit 21 sets the discriminant D of the cubic equation of "s" in above Equation (2).

In following step S3, the control unit 21 treats the discriminant D as a function with the proportional gain St_Kp as a variable and extracts a point at which the discriminant D becomes maximum. Then, the control unit 21 determines the value of the proportional gain St_Kp at the extracted point as an appropriate proportional gain Kpap. Herein, FIG. 4 illustrates a determination example of the appropriate proportional gain Kpap, a vertical axis is set to the discriminant D, and a horizontal axis is set to the proportional gain St_Kp.

In a case where all the poles of the transfer function G(s) in above Equation (1) are negative real numbers or complex numbers including the negative real number part, overshoot is reduced when the imaginary values of the poles decrease with stability. Further, when all the poles are real number solutions, overshoot does not occur. Further, regarding the discriminant D of the cubic equation, when D=0, there is a duplicate solution, and when D>0, there are three different real number solutions.

In this regard, the control unit 21 treats the discriminant D of the Equation (2) as a function with the proportional gain St_Kp as a variable and extracts a point at which the discriminant D becomes maximum. Then, the control unit 21 determines, as an appropriate proportional gain Kpap, the proportional gain St_Kp at a point where the value of the discriminant D becomes maximum. Here, FIG. 4 illustrates an acquisition example of the appropriate proportional gain.

Figure 4:
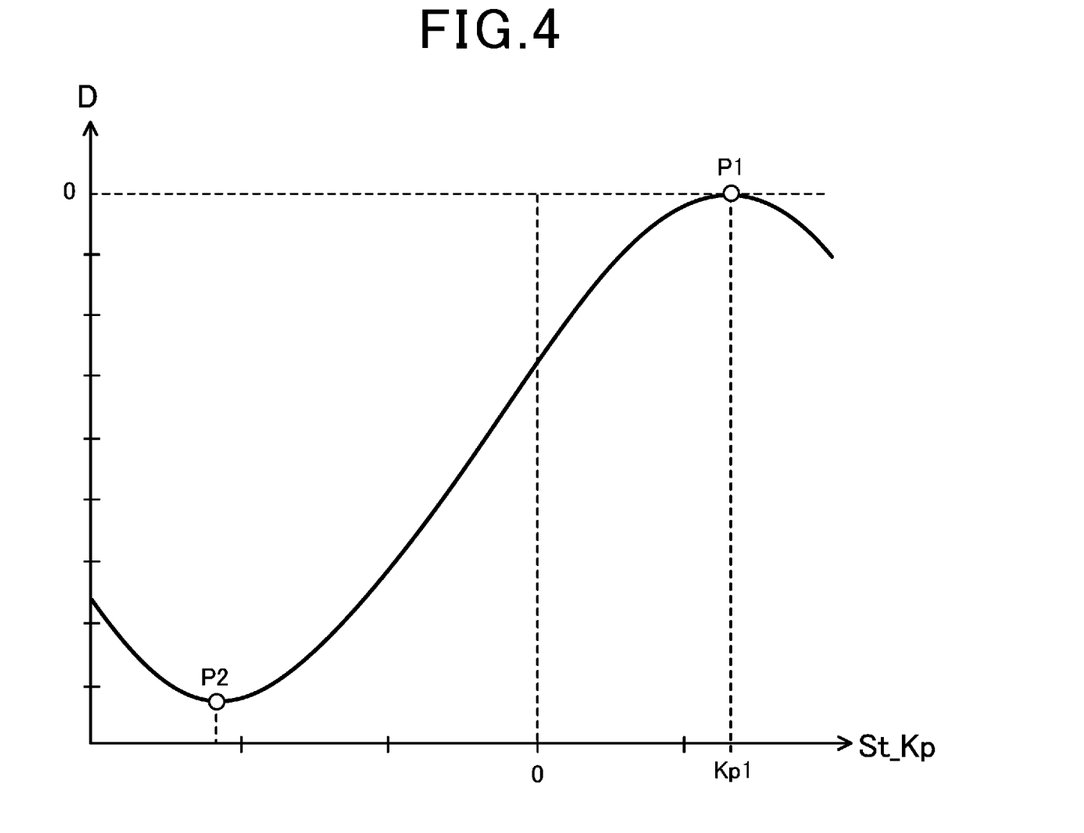
FIG. 4 is an explanatory diagram of a setting process of an appropriate proportional gain.

FIG. 4 illustrates a relationship between the discriminant D and the proportional gain St_Kp with a vertical axis set to the discriminant D and a horizontal axis set to the proportional gain St_Kp. In a range of St_Kp>0, a point P1 of St_Kp=St1 is extracted as the point where the value of the discriminant D becomes maximum. The proportional gain Kp1 at the point P1 is calculated by following Equation (5).

[Math. 5]

$$St\_Kp = \frac{\sqrt{T^4w^4 + 4T^3w^3 + (216KiT^3k + 6T^2)w^2 + (216KiT^2k + 4T)w + 1} + T^2w^2 - 10Tw + 1}{12Tkw} \quad (5)$$

Then, the control unit 21 sets the proportional gain St1 at the point P1 as the appropriate proportional gain Kpap. Incidentally, instead of the maximum value Kp1 of the proportional gain St_Kp, the appropriate proportional gain Kpap may be set to a value slightly (several % or the like) smaller than the maximum value Kp1 on the basis of the maximum value Kp1.

In next step S4, the control unit 21 substitutes the appropriate proportional gain Kpap into the discriminant D, treats the discriminant D as a function with the integral gain Ki as a variable, and extracts the integral gain Ki which becomes maximum within a range of D≥0. Then, the control unit 21 determines the extracted integral gain Ki as an appropriate integral gain Kiap. Here, FIG. 5 illustrates an acquisition example of the appropriate integral gain Kiap.

Figure 5:
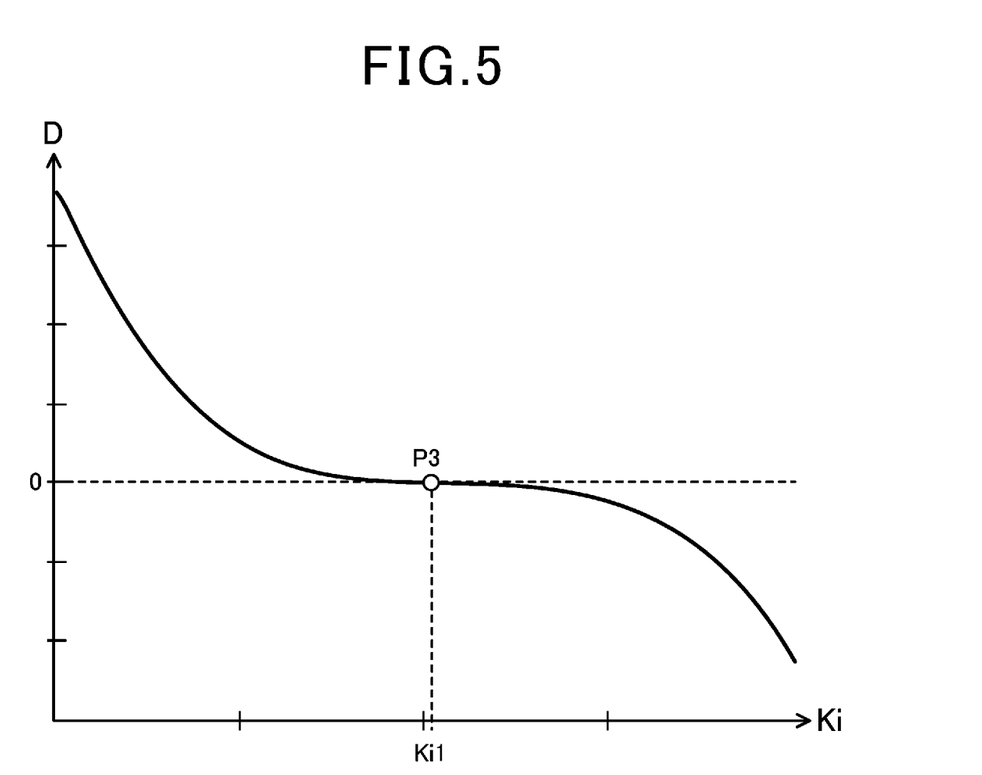
FIG. 5 is an explanatory diagram of a setting process of an appropriate integral gain.

FIG. 5 illustrates a relationship between the discriminant D and the integral gain Ki with a vertical axis set to the discriminant D and a horizontal axis set to the integral gain Ki, and the control unit 21 extracts a point P3 which becomes maximum within a range of D≥0. Then, the control unit 21 determines a value Ki1 of the integral gain Ki at the point P3 as the appropriate integral gain Kiap. Incidentally, instead of the maximum value Ki1 of the integral gain Ki when D 0, the appropriate integral gain Kiap may be set to a value slightly (several % or the like) smaller than the maximum value Ki1 on the basis of the maximum value Ki1.

Subsequently, in following step S5, the control unit 21 uses the appropriate proportional gain Kpap set in step S3 and the appropriate integral gain Kiap set in step S4 to determine the control input Cin for the servomotor 43 according to the block diagram of FIG. 2. Accordingly, it is possible to stabilize the control system and set the proportional gain St_Kp and the integral gain Ki as large as possible with avoiding the overshoot of the measurement test force fs from the target test force fc, and thus it is possible to set the proportional gain St_Kp and integral gain Ki more appropriate for both stability and responsiveness.

Here, in addition to calculating the gain in real time, a correspondence map, which is created by calculating the optimum gain for each predetermined frequency in advance, between the frequency and the optimum gain is prepared, and a configuration may be made such that the optimum gain is obtained with reference to this correspondence map.

6. Other Embodiments

In the above embodiment, in the transfer function G(s) of above Equation (1), the stability of the control system is discriminated by using the discriminant D of the equation of above Equation (2), but the stability may be discriminated by another method.

In the above embodiment, as shown in the above equation (1), a case is described in which the denominator of the transfer function G(s) is cubic. However, in a case where the order of the denominator of the transfer function is the fourth order or higher, when the transfer function is approximated to an equation of third order or less, an appropriate control gain can be obtained by the same processing as in the above embodiment.

In the above embodiment, a configuration is described in which the test force is controlled by proportional control and integral control. However, even in a case where a control by another control method is adopted, the effect of the present invention can be obtained by discriminating the stability of the control system and setting the appropriate control gain. For example, the present invention can be applied even in the case of controlling the physical quantity (displacement, strain, or the like) of the test target and the physical quantity (torque, pressure, or the like) acting on the test target.

In the above embodiment, the appropriate proportional gain and the appropriate integral gain are determined so that the overshoot does not occur. However, the appropriate proportional gain and the appropriate integral gain may be determined so that the overshoot is equal to or less than a predetermined value.

In the above-described embodiment, the servomotor 43 is used as the drive source of the load mechanism 40. However, another drive source such as a hydraulic source may be used. Alternatively, a drive source of an electromagnetic drive type, an air drive type, or the like may be used. In this case, an approximate expression 205 of an operation target in the block diagram of FIG. 2 is set according to the specifications of the load mechanism.

In the above-described embodiment, the functional block illustrated in FIG. 1 is a schematic diagram illustrating the components which are classified according to the main processing contents in order to facilitate understanding of the present invention, and the components can be further classified into more components according to the processing contents. Further, one component can be further classified to perform more processes.

In the above-described embodiment, the material testing machine 1 which performs a tensile test is described as the material testing machine of the present invention. However, the present invention can be widely applied to the material testing machine which applies a test force to the test piece to measure a physical change which occurs in the test piece. For example, the present invention can be applied to a material testing machine which performs a compression test, a bending test, a peeling test, a fatigue test, and the like.

REFERENCE SIGNS LIST

1 Material testing machine
2 Testing machine body
10 Control device
20 CPU
21 Control unit
22 Measurement unit
36 Load cell
40 Load mechanism
43 Servomotor
60 Extensometer
100 PC
TP Test piece

What is claimed is:

1. A material testing machine comprising:
a load mechanism which applies a test force to a test target;
a measuring instrument which measures a physical quantity of the test target which changes according to the test force or the application of the test force; and
a control unit which performs a material test on the test target by controlling the test force, the physical quantity of the test target, or a physical quantity acting on the test target to reduce a difference between a predetermined target value and a value measured by the measuring instrument, wherein
the control unit
performs control input for the load mechanism via a low-pass filter,
determines, when setting of the low-pass filter is changed, an appropriate control gain based on a control gain within a range where a control system including the load mechanism and the low-pass filter is stable, and
controls an operation of the load mechanism by using the appropriate control gain.

2. The material testing machine according to claim 1, wherein
the control unit controls the test force by proportional control and integral control, the control gain is an integral gain and a proportional gain, and an appropriate proportional gain and an appropriate integral gain are determined as the appropriate control gain.

3. The material testing machine according to claim 2, wherein
in a discriminant of an equation with a denominator of a transfer function of the control system as 0, the control unit extracts a point at which a value of the discriminant becomes maximum when the proportional gain is used as a variable and determines the appropriate proportional gain on a basis of the proportional gain at the extracted point.

4. The material testing machine according to claim 3, wherein
when the appropriate proportional gain is substituted into the discriminant, and the integral gain is used as a variable, the control unit determines the appropriate integral gain on a basis of the maximum integral gain in a range where a value of the discriminant is 0 or more.

5. The material testing machine according to claim 3 or 4, wherein
when an order of a denominator of the transfer function is a fourth order or higher, the control unit uses, as the discriminant, a discriminant of an equation obtained by approximating the denominator to a third order or less.

6. A method for controlling a material testing machine carried out in the material testing machine which includes
   a load mechanism which applies a test force to a test target,
   a measuring instrument which measures a physical quantity of the test target which changes according to the test force or the application of the test force, and
   a control unit which performs a material test on the test target by controlling the test force, a physical quantity of the test target, or a physical quantity acting on the test target to reduce a difference between a predetermined target value and a value measured by the measuring instrument, the method comprising:
   a step of the control unit performing control input for the load mechanism via a low-pass filter;
   a step of the control unit determining, when setting of the low-pass filter is changed, an appropriate control gain based on a control gain within a range where a control system including the load mechanism and the low-pass filter is stable; and
   a step of the control unit controlling an operation of the load mechanism by using the appropriate control gain.

* * * * *